United States Patent [19]

Frey et al.

[11] 4,181,971

[45] Jan. 1, 1980

[54] APPARATUS FOR PRESENTING A SEQUENCE OF FIXED PICTURES

[75] Inventors: Richard C. Frey; Malcolm R. Railey, both of Akron, Ohio; Thomas J. Wargo, Waukegan, Ill.

[73] Assignee: The University of Akron, Akron, Ohio

[21] Appl. No.: 656,395

[22] Filed: Feb. 9, 1976

[51] Int. Cl.² .............................................. G06F 3/14
[52] U.S. Cl. .................................. 364/900; 340/724; 340/798; 358/142; 364/521
[58] Field of Search ........ 340/172.5, 324 A, 324 AD, 340/724, 798, 723; 445/1; 444/1; 235/151; 364/200 MS File, 900 MS File, 521; 358/142

[56] References Cited

U.S. PATENT DOCUMENTS

| | | | |
|---|---|---|---|
| Re. 28,598 | 10/1975 | Baer et al. | 340/324 AD |
| 3,534,396 | 10/1970 | Hart et al. | 340/172.5 |
| 3,665,419 | 5/1972 | Hartmann et al. | 340/172.5 |
| 3,736,411 | 5/1973 | Berndt | 444/1 X |
| 3,747,087 | 7/1973 | Harrison et al. | 340/324 AD |
| 3,750,109 | 7/1973 | Smith | 340/172.5 |
| 3,778,058 | 12/1973 | Rausch | 340/324 AD |
| 3,809,395 | 5/1974 | Allison et al. | 273/1 E |
| 3,809,868 | 5/1974 | Villalobos et al. | 235/151 |
| 3,882,446 | 5/1975 | Brittian et al. | 340/172.5 |
| 3,895,357 | 7/1975 | Schwartz et al. | 364/200 |
| 3,899,662 | 8/1975 | Kreeger et al. | 235/151 |
| 4,016,362 | 4/1977 | Bristow et al. | 358/142 |

Primary Examiner—Mark E. Nusbaum
Attorney, Agent, or Firm—Hamilton, Renner & Kenner

[57] ABSTRACT

Disclosed is a device which can utilize, as an input signal, the solution to mathematical problems from an analog computer or which can be used directly with a process that is governed by a mathematical problem to pictorially depict the solution to the problem. The problem being solved can be dynamically displayed on a device such as a conventional television receiver for use by a student, technician or the like. The input signal indicative of the solution of the mathematical problem is fed to a memory and control device which can store the same for subsequent use. The memory also has stored therein data representative of the images necessary to create the pictorial representation of the problem. A programmable device, preferably in the form of a digital computer, interprets the input signals and directs the data in the memory so that it is properly displayed on the television receiver.

35 Claims, 11 Drawing Figures

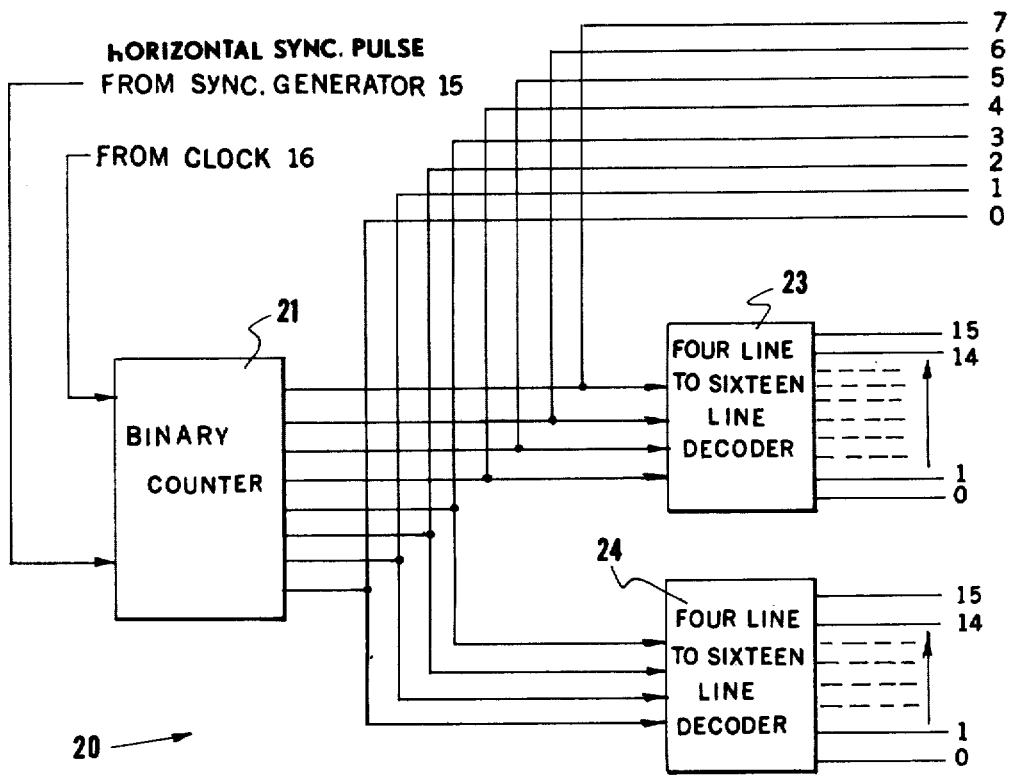
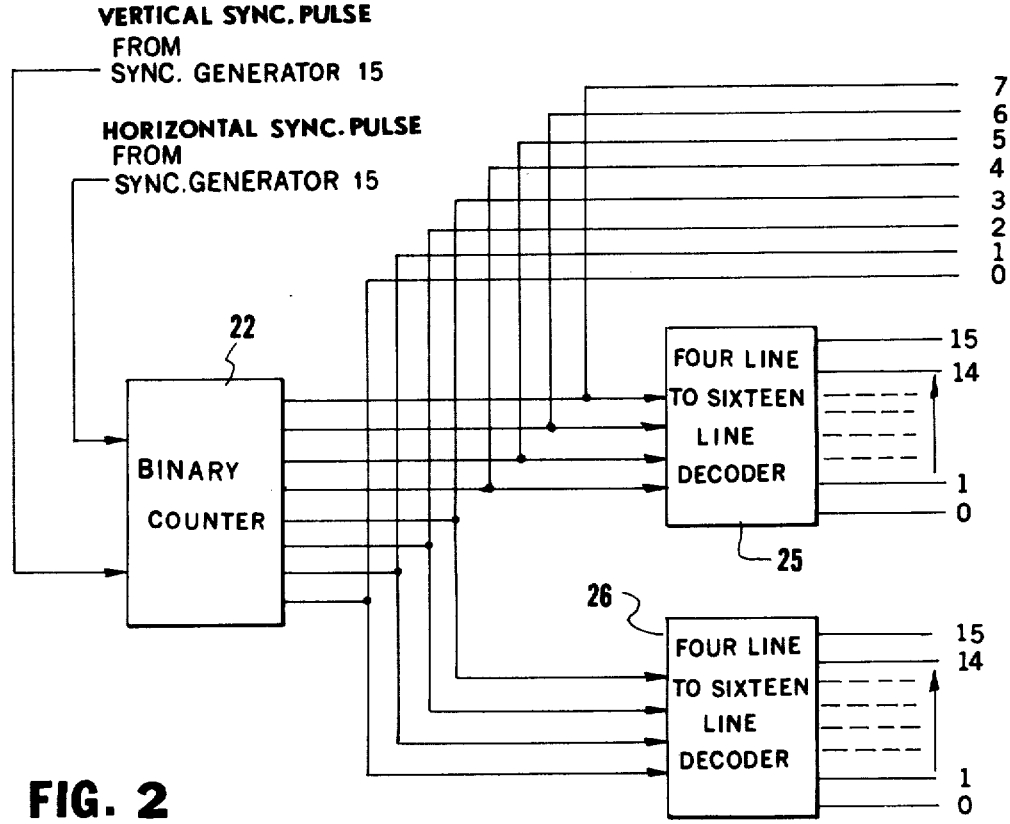
FIG. 2

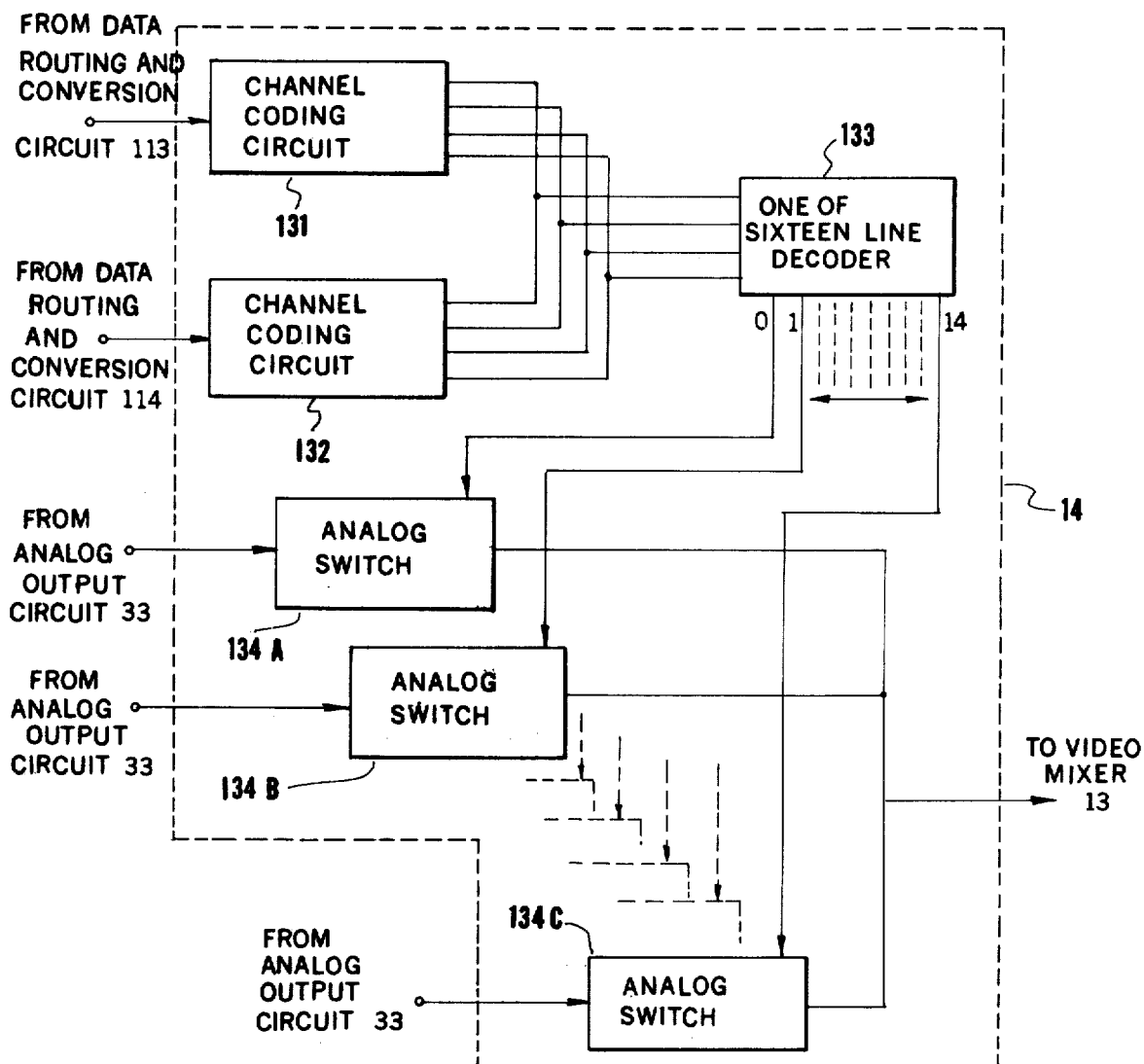
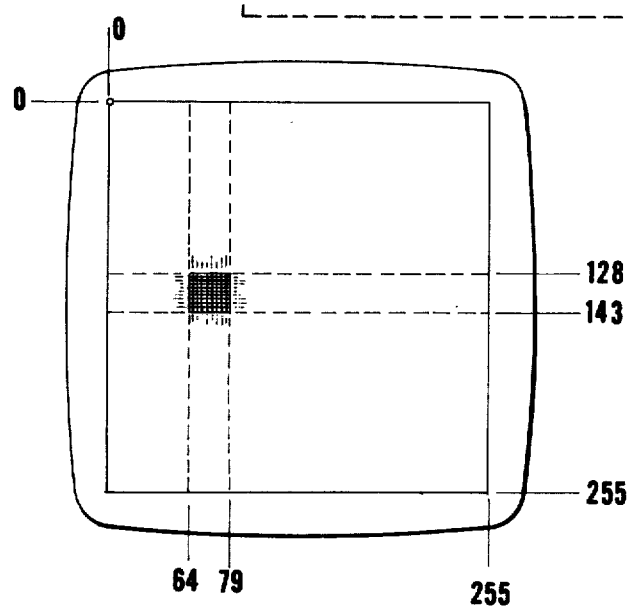
FIG. 8
FIG. 9
½" = { 16 DOTS OR 16 LINES

APPARATUS FOR PRESENTING A SEQUENCE OF FIXED PICTURES

BACKGROUND OF THE INVENTION

This invention relates to a device for pictorially representing a mathematical problem. More particularly, the invention relates to a device which can receive, as an input, signals from a monitored process which is governed by a mathematical principle or signals from an analog computer programmed to solve the mathematical problem governing the process thereby simulating the process. The device controls those signals to present images on a displaying apparatus so as to dynamically animate the solution to the problem.

It has been known that solutions to specific mathematical problems can be solved by an analog computer and displayed on such devices as an x-y plotter or oscilliscope. In addition parameters of actual physical processes which perform according to mathematical equations have been monitored and displayed for quality control and other purposes.

The art, however, particularly as it relates to educators and the like, has long felt the need for a device which could utilize the solutions to any mathematical problems or the input from an actual physical process whose operation is governed by a mathematical problem, and by using digital memory and control units, depict the solution to the problem in a pictorial form. In the devices of the prior art of which we are aware, there is no ability to display any type of image, moving or fixed; no ability to adjust parameters in the mathematical problem, either manually or automatically; no ability to present the solution to the problem repetively or to stop and hold the solution at a desired point therein; no ability to vary the intensity of the images in accordance with the solution; and no means by which the same instrument can be utilized for any problem or a plurality of problems.

SUMMARY OF THE INVENTION

It is therefore a primary object of the present invention to provide a device which is usable with a displaying apparatus to depict a dynamic pictorial representation of the solution to a mathematical problem, either as simulated by a computer or as received directly from an actual process being performed according to the mathematical problem.

It is another object of the present invention to provide a device, as above, which can be utilized to display the solution to any mathematical problem.

It is a further object of the present invention to provide a device, as above, which has the capabilities of manually or automatically changing parameters of the mathematical problem so that the user of the same can visually determine the effect of the change in parameters on the solution.

It is yet another object of the present invention to provide a device, as above, which has the capabilities of repetitively displaying the solution to the problem and stopping the dynamic solution to the problem, as desired.

It is still another object of the present invention to provide a device, as above, which can utilize any type of image, moving or fixed, to depict the pictorial representation of the solution to the problem.

It is a still further object of the present invention to provide a device, as above, in which the intensity of the display of individual images can be varied to further depict the pictorial representation of the problem.

These and other objects of the present invention, which will become apparent from the description to follow, are accomplished by the means hereinafter described and claimed.

In general, the device which presents a dynamic pictorial representation consisting of a number of images utilizes, as an input, a signal from a device whose operation is governed by a mathematical problem. The input signal is indicative of the solution to the problem. The images are displayed according to the solution of the problem. A control device stores data representative of the images and also receives the signals indicative of the answers to the mathematical problem. A programmable device interprets the answers to the problem and directs the control device in displaying the images.

BRIEF DESCRIPTION OF THE DRAWINGS

FIG. 2 is a block diagram showing the details of the beam tracker shown in block form in FIG. 1.

FIG. 8 is a diagrammatic representation of a television screen having a 16 by 16 dot matrix illuminated.

FIG. 9 is a block diagram showing the details of the data mixer shown in block form in FIG. 1.

DESCRIPTION OF THE PREFERRED EMBODIMENT

Figure 1:
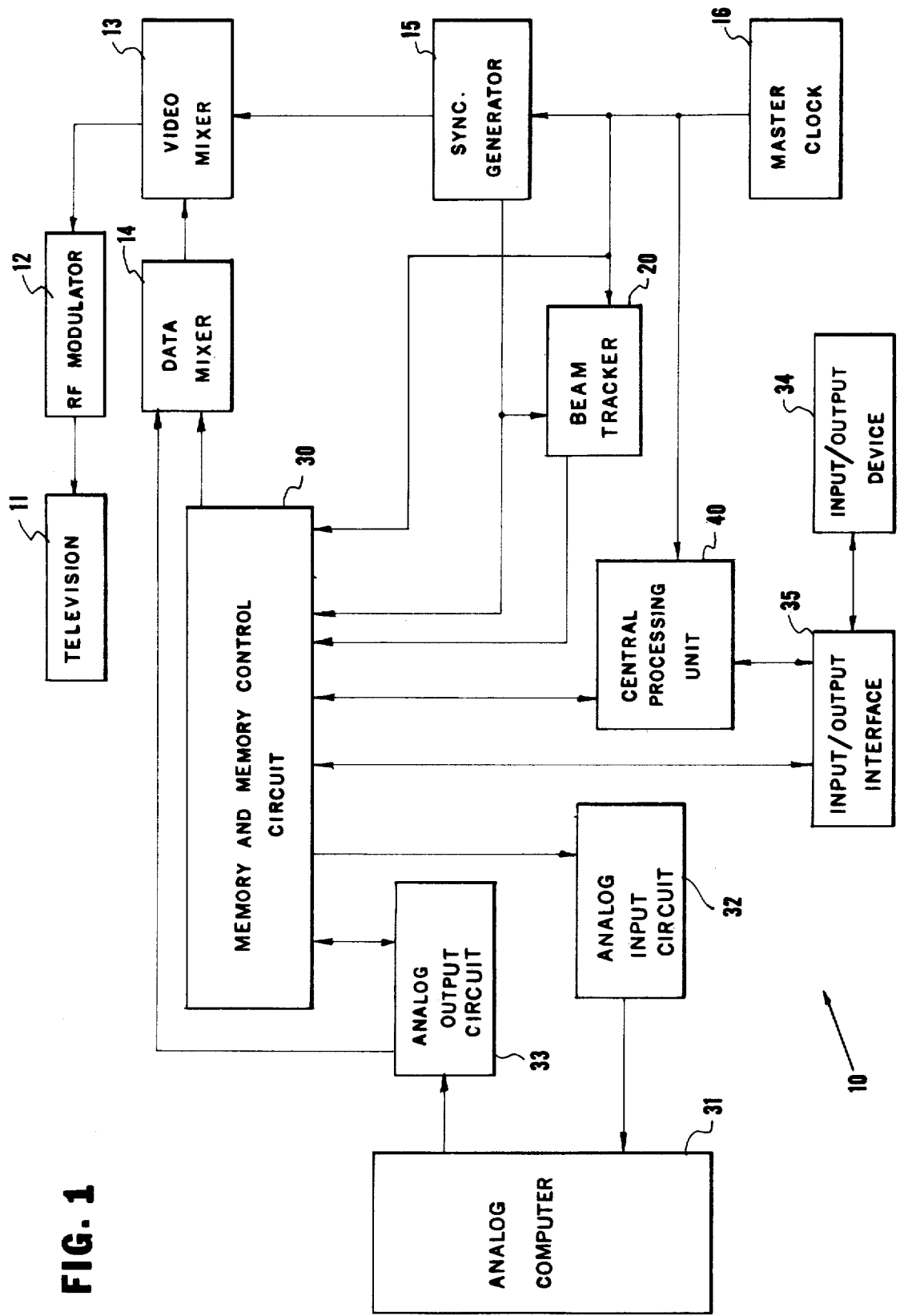
FIG. 1 is an overall block diagram of the apparatus for presenting a pictorial representation of the solution to a mathematical problem.

The apparatus for presenting a pictorial representation of the solution to a mathematical problem is indicated generally by the numeral 10 in FIG. 1. An output device, preferably in the form of a conventional television receiver 11, provides, for purposes of this description, the pictorial representations to be viewed in the form of dot images contained by a 256 by 256 dot master matrix. A conventional radio frequency (RF) modulator 12 is attached to the antenna terminals of television 11 to render the composite video signal from a video mixer 13 compatible in frequency with television 11. If an output device other than a conventional television were used, such as a video monitor, the RF modulator may not be necessary.

Video mixer 13 is a conventional item which receives input data from a data mixer 14, to be hereinafter described, and receives a signal from a conventional sync generator 15. The signal from sync generator 15 is a 60 Hz. periodic wave and represents the vertical and horizontal sync pulses superimposed on each other in time to control the scanning of the electron beam in television 11. The signal from data mixer 14 is a continuously changing analog voltage representative of beam modulation at each location within the master matrix. Thus, video mixer 13 receives the signal from sync generator 15 controlling the location of the beam and the signal from data mixer 14 controlling the intensity of the beam at various locations along the beam path to provide the output signal to RF modulator 12.

The timing of the sync generator 15 is coordinated by a frequency signal from a master clock 16. The frequency of clock 16, which can be, for example, 4.56 MHz, thus controls the width of the dot in the horizontal direction in the matrix.

The signal from master clock 16 and the separate horizontal and vertical signals from sync generator 15 are fed to a beam tracker circuit indicated generally by the numeral 20 in FIG. 1 and shown in detail in FIG. 2. The function of beam tracker 20 is to provide a signal indicative of the location of the electron beam of television 11 within the 256 by 256 dot master matrix. For this purpose a binary counter 21 counts the input signal from clock 16 indicative of the horizontal location of the beam within the matrix. Counter 21 is reset upon the occurrence of the horizontal sync pulse indicative of the beginning of a line of dots within the matrix. At the same time a second binary counter 22 receives both the horizontal sync signal and the vertical sync signal. Counter 22 counts the horizontal sync signals indicative of the vertical location of the beam within the master matrix and is reset upon the occurrence of the vertical sync pulse indicative of the beginning of one complete scan of the matrix.

The outputs of counters 21 and 22 are conventional eight bit binary numbers. These eight bit numbers are one form of output of beam tracker 20 to be utilized as hereinafter described. Beam tracker 20 also provides additional coded output signals representative of the location of the scanning beam. For this purpose the 256 by 256 master matrix has been arbitrarily divided into 256 submatrices within which remain a matrix of 16 by 16 dots. The four most significant bits from counter 21 are fed to a conventional four-line-to-sixteen-line decoder 23 which reads the information from counter 21 and converts it from binary form to a hexidecimal form. Thus, one of the sixteen output wires of decoder 23, using positive logic, will go low indicating within which column of submatrices the beam is currently situated. The four least significant bits from counter 21 are fed to another four-line-to-sixteen-line decoder 24 which takes this information from counter 21 and converts it from binary form to hexidecimal form. Thus, one of the sixteen output wires of decoder 24, using positive logic, will go low indicating the column of dots within the column of submatrices indicated by decoder 23 that the beam is currently situated. For example, if the output of counter 21 were 01001100, the output wire of decoder 23 representing the hexidecimal form of the binary number 0100 would be low indicating that the beam currently was situated somewhere in the number four column of submatrices, and the output wire of decoder 24 representing the hexidecimal form of the binary number 1100 would be low indicating that the beam currently was in the twelfth column of dots in the fourth column of submatrices.

To locate the row location of the dot, the four most significant bits from counter 22 are fed to another four-line-to-sixteen-line decoder 25 which reads the information from counter 22 and converts it from binary form to a hexadecimal form. Thus, one of the sixteen output wires of decoder 25, using positive logic, will go low indicating within which row of submatrices the beam is currently situated. The four least significant bits from counter 22 are fed to another four-line-to-sixteen-line decoder 26 which takes this information from counter 22 and converts it from binary form to hexidecimal form. Thus, one of the sixteen output wires of decoder 26, using positive logic, will go low indicating the row of dots within the row of submatrices indicated by decoder 25 that the beam is currently situated. For example, if the output of counter 22 were 10101110, the output wire of decoder 25 representing hexidecimal 10 would be low indicating that the beam currently was situated somewhere in the number 10 row of submatrices, and the output wire of decoder 26 representing hexidecimal 14 would be low indicating that the beam currently was in the fourteenth row of dots in the tenth row of submatrices.

Taken together the information from decoders 23, 24, 25 and 26 will give the precise instantaneous location of the beam. In the example given, the beam would be located in the 76th column and 174th row position of the 256 by 256 master matrix.

Thus, the output of beam tracker 20 is in reality 80 wires, two sets of eight wires giving the output in binary code and two sets of 32 wires giving the output in hexidecimal coded form. Both outputs represent a signal indicative of the location of the beam within the 256 by 256 dot master matrix at any point in time. The signal is transmitted to a memory and control circuit 30 to be hereinafter described.

The solutions to the mathematical problems which are eventually displayed on television 11 can be taken from transducers which are monitoring an actual physical process, the operation of which is governed by a mathematical problem, can be provided by a conventional digital computer, or, as shown herein can be provided by a conventional analog computer 31, such as an EAI MiniAC Computer manufactured by Electronic Associates, Inc., West Long Beach, N.J. As is evident to one skilled in the art, computer 31 can be programmed according to the instructions provided therewith to solve essentially any type of mathematical problem. Such mathematical problems will always have variables involved which modify the equations that govern the behavior of the solution to the problem. In order to demonstrate how a change in these variables will affect the solution to the problem, it is important for this example that these changes can be made in the analog computer 31. While these changes can be made manually, as by adjusting controls on the control panel of the analog computer, it is convenient to be able to automatically change variables according to a preselected pattern. To this end, a plurality of eight bit logic signals can be fed from memory and control circuit 30, in a manner to be hereinafter described, to an analog input circuit 32. Circuit 32 can include a plurality of conventional digital to analog converters which read the eight bit signals and convert them to analog voltages to adjust the variables accordingly. Analog input circuit 32 can also receive an eight bit signal from memory 30 to control the mode of analog computer 31. In this event a conventional decoder/demultiplexer can be utilized to convert the eight bit logic signal to control command signals to the analog computer 31 to place the computer in a variety of modes such as start, stop, hold or reset. Of course, these modes could be manually controlled, if desired, by the operator.

The analog output of computer 31 is received by an analog output circuit 33 which can be designed to perform a number of functions. Of primary importance, the circuit 33 includes conventional analog to digital converters which receive the analog solutions to the problem being considered and converts those signals to eight bit logic signals, usable by memory and control circuit 30. In addition, it is often desirable to vary the intensity of the light of at least a portion of the pictorial solution being displayed on television 11. For example, if one were looking at a problem wherein a change in concentration of a solution was being depicted, by changing the intensity of the beam, a more or less concentrated solution could be indicated. To this end, the analog computer 31 can be programmed to provide intensity data which can be amplified in analog output circuit 33 for suitable interface with components in the data mixer 14. As would be evident to one skilled in the art, the analog computer 31 could provide signals indicative of color variations so that a particular problem could be depicted in color form. Of course, additional circuitry, well known in the art, would have to be included to provide color depiction.

Analog output circuit 33 can also include a conventional multiplexer which receives signals from computer 31 indicative of the status thereof, such as run, stop, hold, reset and the like, and convert that signal to an eight bit logic signal usable by memory 30 so that the memory can be aware of the status of computer 31.

The input data for apparatus 10 originates from an input/output device 34 which can be in the form of a paper tape device, magnetic tape device, keyboard or the like. Device 34 is used to provide all the digital input data to the system, for example, to program the central processing unit 40, to be hereinafter described; to provide system commands, such as start and stop signals for the analog computer 31; and to provide such things as the automatic change in variables through memory 30 to the analog input circuit 32 as previously described. The data being fed in through input/output device 34 is received by an input/output interface 35 which, as is well known in the art, processes the data into a form usable by other system components, in this instance, the central processing unit 40. Interface 35 receives its control signals from memory 30 in a manner to be hereinafter described. Device 34 can, of course, receive data back from central processing unit 40. For example, once a program is manually fed to the central processing unit 40, it can be read out by the input/output device 34 and permanently recorded, as on paper tape.

Figure 3:
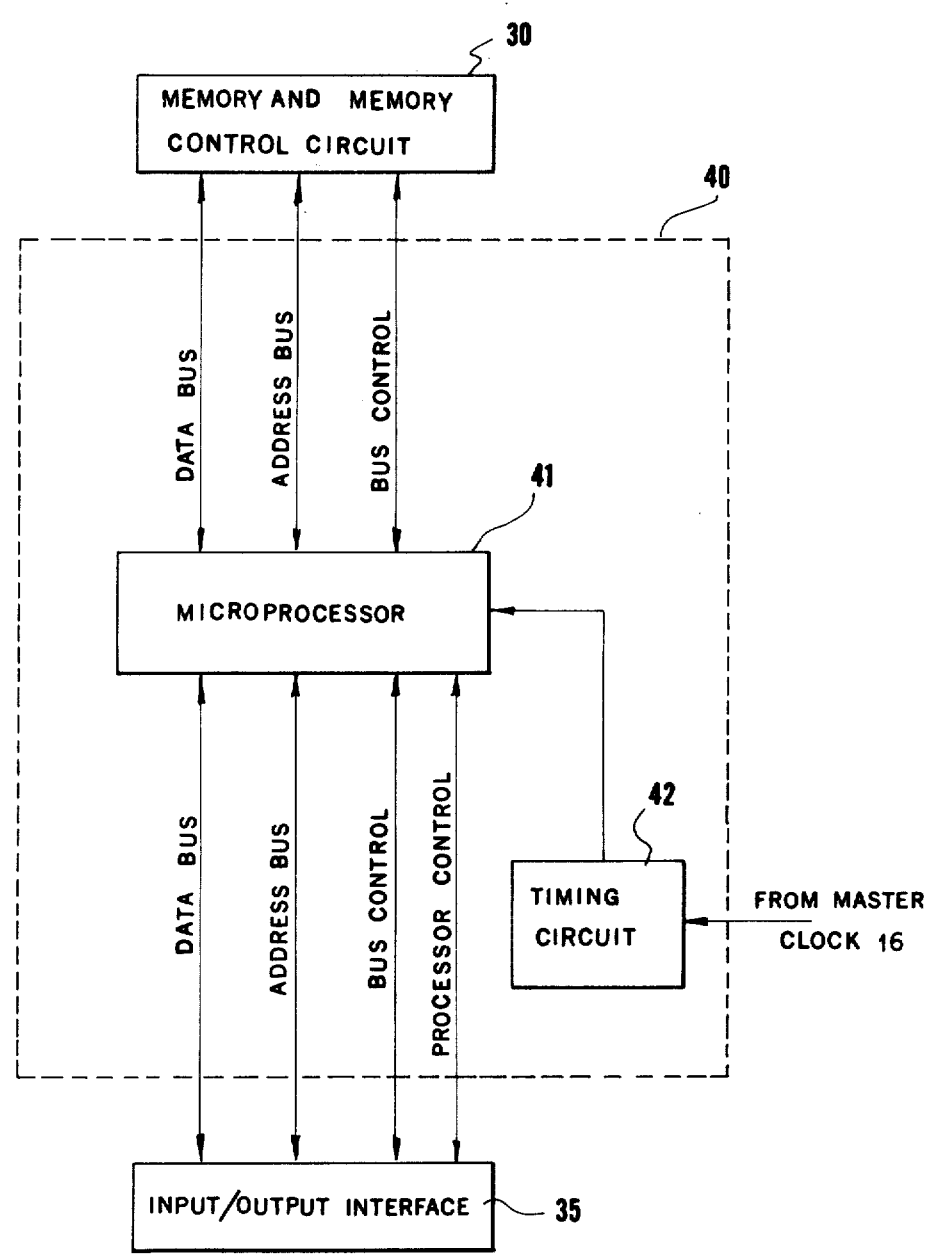
FIG. 3 is a block diagram showing the details of the central processing unit shown in block form in FIG. 1.

The central processing unit 40 is shown in more detail in FIG. 3, with the heart of the unit being a conventional microprocessor 41. While any suitable microprocessor available on the market would be usable in this sytem, Model M6800 manufactured by Motorola Semiconductor Products, Incorporated, Phoenix, Ariz. has been found acceptable. A timing circuit 42 paces microprocessor 41 according to manufacturer's specifications. Circuit 42 receives the timing signal from clock 16, divides it down to the proper frequency and phase relationship for microprocessor 41 and generates the proper wave shape for microprocessor 41.

Microprocessor 41 communicates with the input/output interface 35 and memory and control circuit 30 through address, data and control busses, as is well known in the art. In addition, the mode of the microprocessor is controlled by a signal from the input/output interface 35 through a microprocessor control bus.

Figure 4:
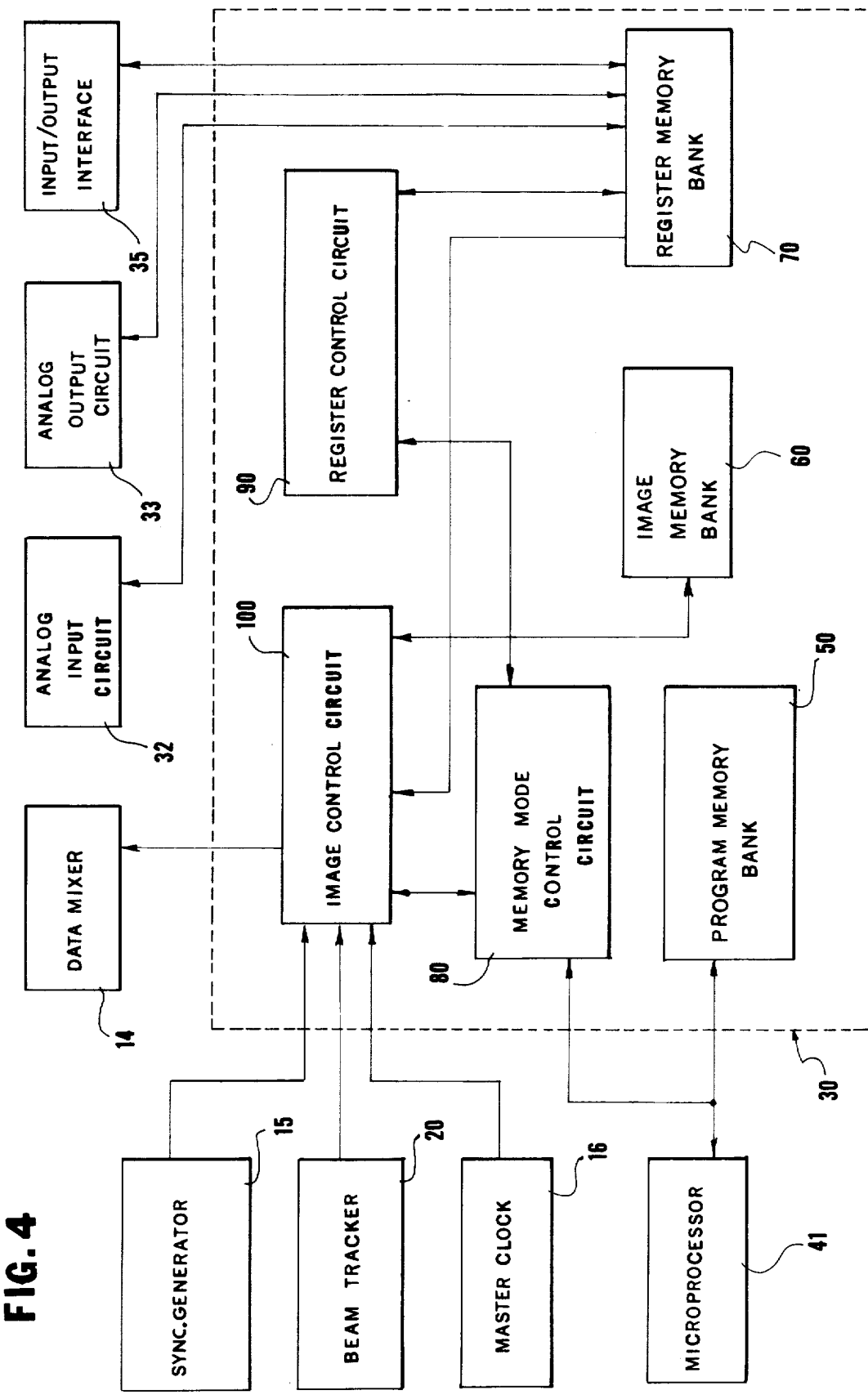
FIG. 4 is a block diagram showing the details of the memory and memory control circuit shown in block form in FIG. 1 and its interrelationship with other circuits.

The memory and control unit 30 and the manner in which it operates with other system components is best shown in FIG. 4. Basically, memory and control unit 30 includes semiconductor memory elements divided for convenience of control into three banks, a program memory bank 50, an image memory bank 60 and a register memory bank 70. As will hereinafter become evident, program memory 50 is manipulated by microprocessor 41; register memory 70 is manipulated by microprocessor 41, through memory mode control circuit 80 and register control circuit 90; and image memory 60 is manipulated by image control circuit 100 which is, in turn, controlled by microprocessor 41 through memory mode control circuit 80 and register memory 70.

Figure 5:
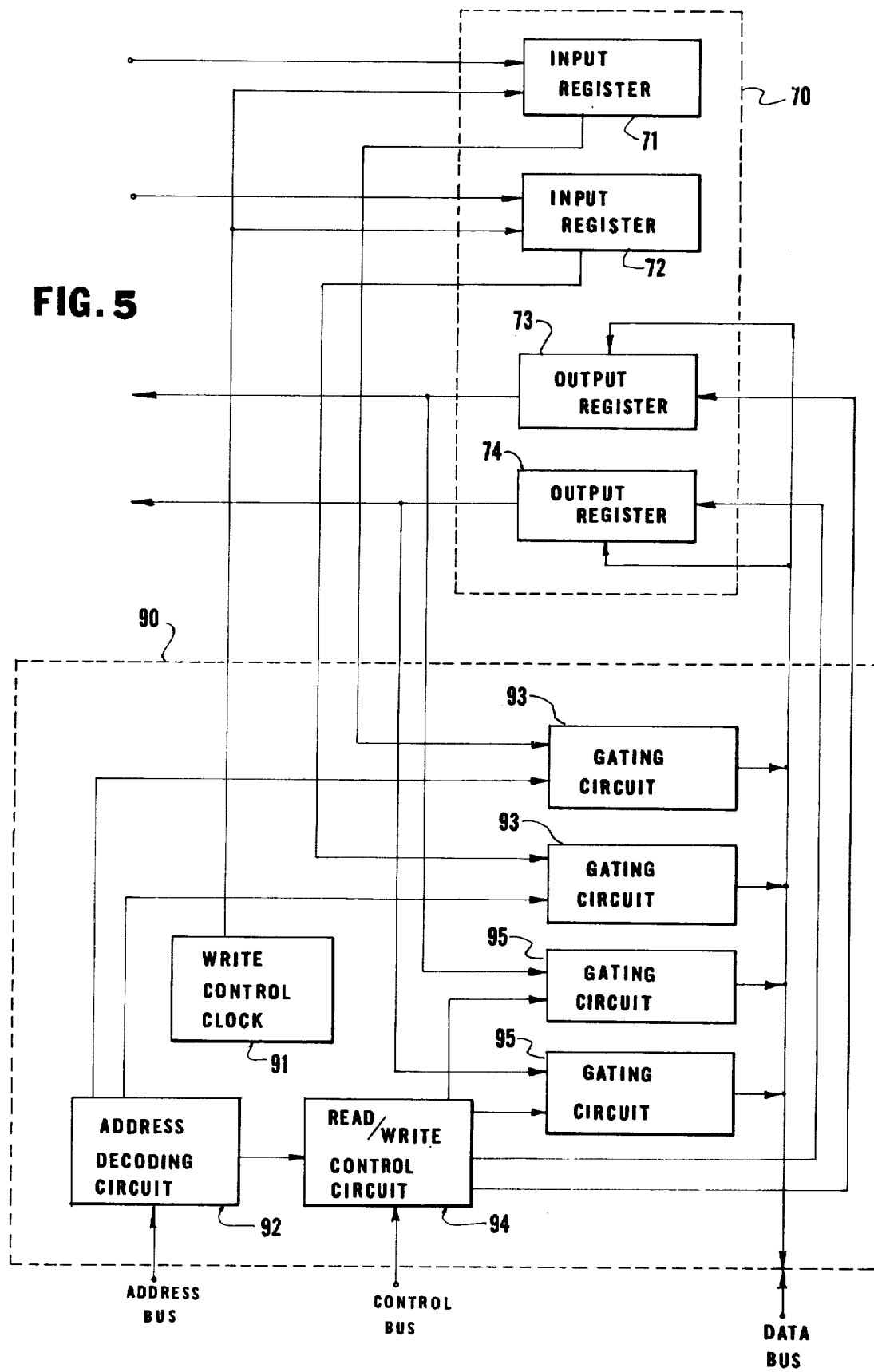
FIG. 5 is a block diagram showing the details and interrelationship of the register memory bank and register control circuit shown in block form in FIG. 4.

Register memory 70 and register control circuit 90 can best be explained by reference to FIG. 5. Register memory 70 includes a bank of input registers, two of which are shown herein for purposes of explanation and indicated by the numerals 71 and 72, and also includes output registers, two of which are shown herein for purposes of explanation and indicated by the numerals 73 and 74. For each 8 bit word of information to be input to or output from memory 70, a unique address or location in memory identifying the particular input or output register is assigned so that microprocessor 41 has access to the data. A preselected number of input registers are reserved to receive specific data. For example, answers to the problem being solved through analog output circuit 33; information pertaining to the status of analog computer 31 through analog output circuit 33; information pertaining to the status of input/output device 34 through interface 35; and the like are all received by register memory 70 and stored in specific input registers therein. The timing of the storage of data from devices 32, 33 and 35 is controlled by a write control clock 91 within register control 90. Clock 91 can be a free running oscillator with wave shaping for compatability. Manipulation of data in output registers 73, 74 is controlled by microprocessor 41 and that data is continuously available to devices 32, 33 and 35. For example, equation parameters for conversion by analog input circuit 32; analog computer mode information for conversion by circuit 32; input/output device 34 mode information for conversion by input/output interface 35; and the like are all available in specific output registers.

Register control circuit 90 provides the means by which microprocessor 41 can receive, that is, read the data from input registers 71, 72 and output registers 73, 74 and also the means by which the microprocessor can modify, that is, load new data in the output registers 73, 74. When microprocessor 41 through its program wants to read data from memory 70, a read command and the address which is to be read are outputted on the control bus and address bus respectively to the memory mode control circuit 80 and program memory 50. The function of circuit 80 is to determine whether microprocessor 41 wants to read data from image memory 60 or register memory 70. Circuit 80 receives the address bus signal and through conventional address decoding determines whether the particular address involved is assigned to image memory 60 or register memory 70. If the address is determined to be within the range of addresses in image memory 60, an enable signal and the address are sent to image control 100 for use in a manner to be hereinafter described. Similarly, if the address is determined to be within the range of addresses in register memory 70, an enable signal and the address are sent to register control circuit 90.

Register control circuit 90 receives the address information and in conjunction with a conventional address decoding circuit 92 which determines whether the information to be read is contained in input registers 71, 72 or output registers 73, 74. If contained in registers 71, 72, circuit 92 provides an enable command to one of a plurality of gating circuits 93 which permits the data stored at the particular address to be transmitted on the data bus to microprocessor 41 through memory mode control circuit 80. Each input register is provided with a gating circuit 93. If address decoding circuit 92 determines that the information to be read is contained in output registers 73, 74, the address is transmitted to a read/write control circuit 94. Control circuit 94 also receives a coded control command on the control bus of microprocessor 41 indicative of whether the microprocessor wants to read from or write information into registers 73, 74. In the instance presently being described, a read signal would appear on the control bus and this signal coupled with the address signal from decoder 92 would permit control circuit 94 to provide an enable command to one of a plurality of gating circuits 95 which permits the data stored at the particular address to be transmitted on the data bus to microprocessor 41. Each output register is provided with a gating circuit 95. In the event that the coded command signal to control circuit 94 indicates that the microprocessor wishes to write information in a particular output register, the particular gating circuit 95 is not enabled but rather the data is directly stored in the particular register involved.

Microprocessor 41 is controlled by program memory 50 which is a conventional random access word addressable memory unit. Once the desired program for the microprocessor is fed into memory 50, the sequential operation of the microprocessor will be governed thereby.

Figure 6:
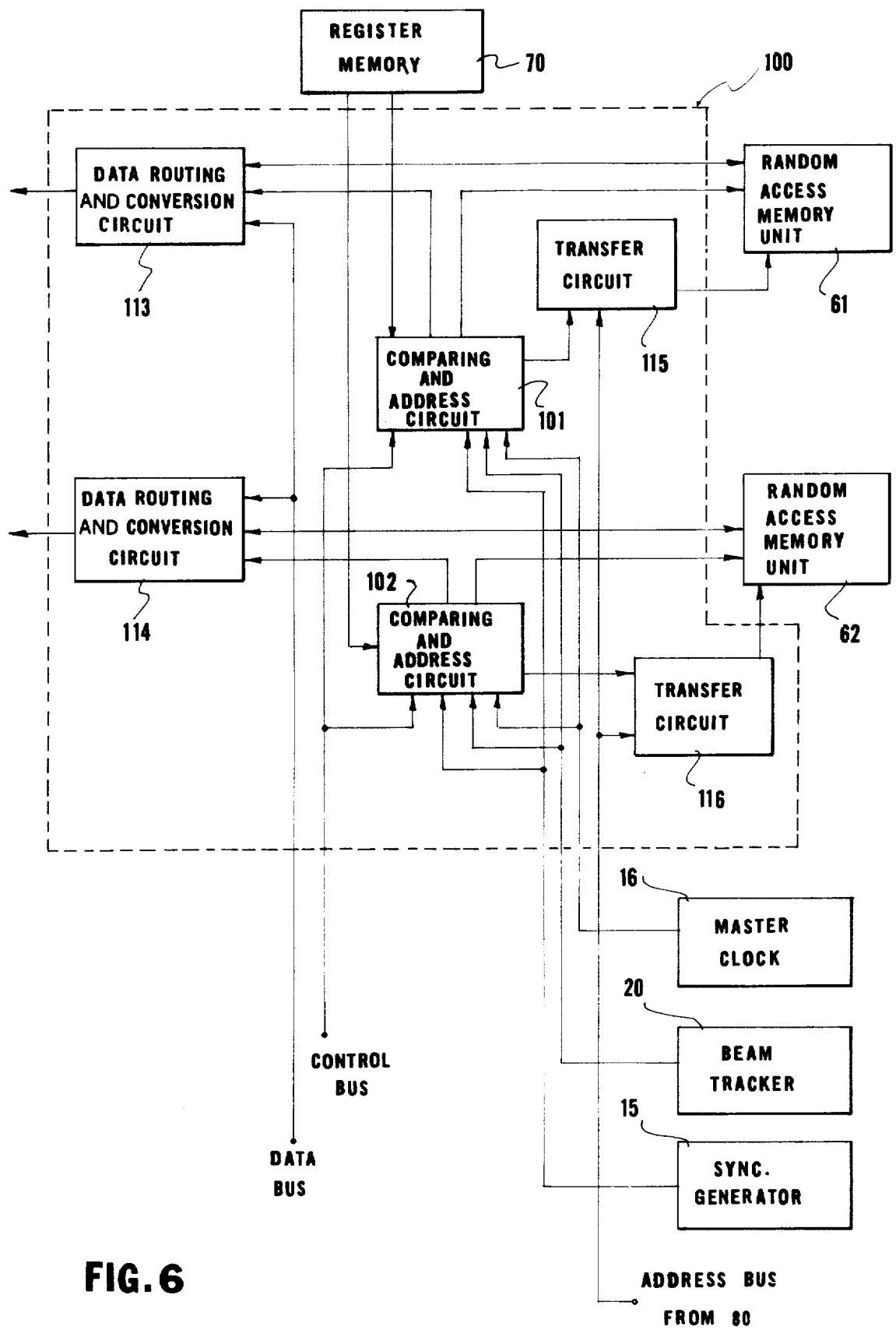
FIG. 6 is a block diagram showing the details of the image control circuit shown in block form in FIG. 4 and its interrelationship with other circuits.

Image memory 60 includes a plurality of random access word addressable memory units, two of which are shown for purposes of explanation herein and indicated by the numerals 61 and 62 in FIG. 6. Each memory unit using groups of eight dots to form 8 bit words stores an image to be depicted on television 11.

The particular image or images to be displayed at any one time from image memory 60 are controlled by image control circuit 100 best shown in FIG. 6. Image control circuit 100 includes a plurality of comparing and address circuits, two being shown herein for purposes of explanation and indicated by the numerals 101 and 102. In actuality, there is one comparing and address circuit for each memory unit of image memory 60 and thus one for each image to be depicted.

Figure 7:
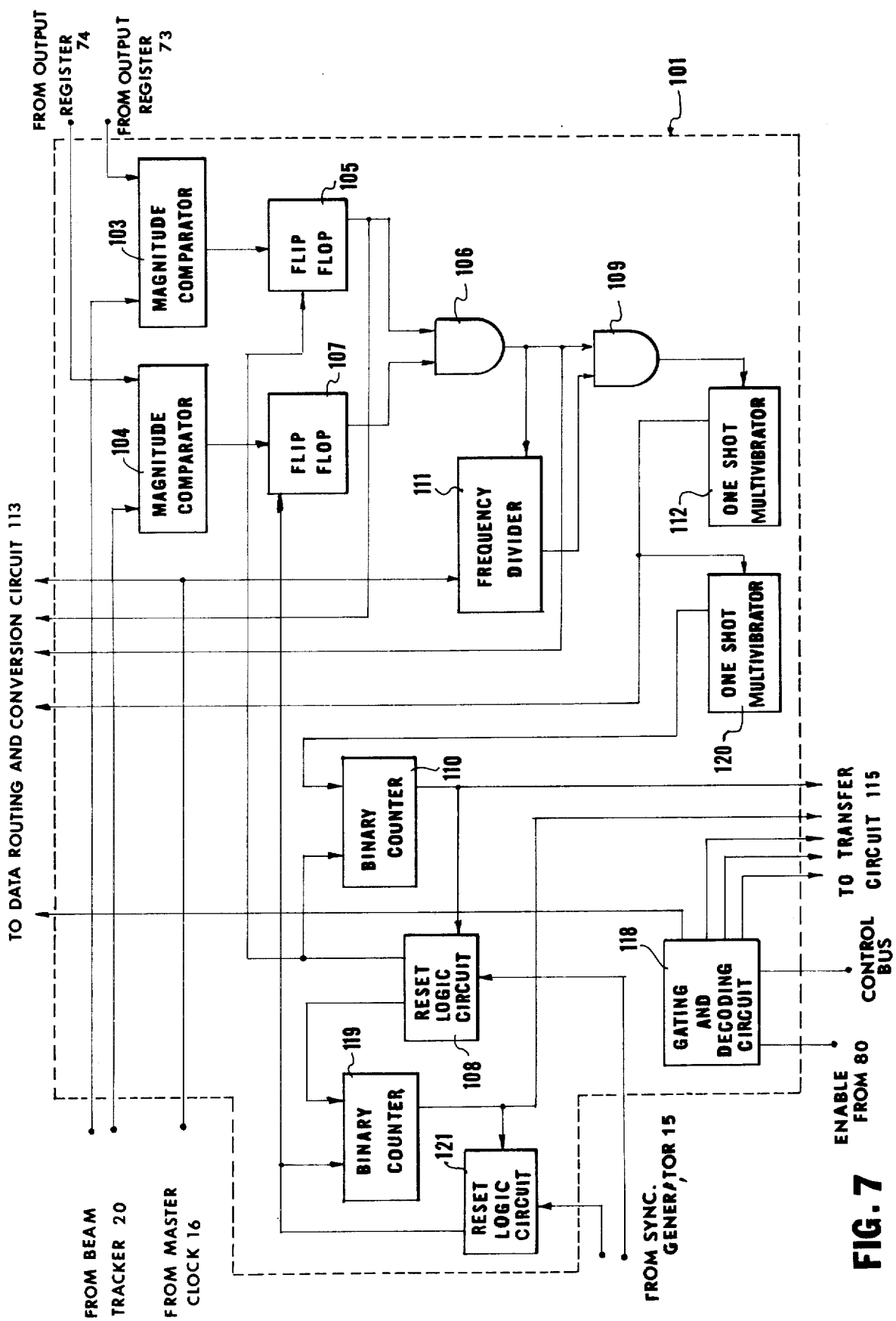
FIG. 7 is a block diagram showing the details of a comparing and address circuit shown in block form in FIG. 6.

The details of a comparing and address circuit are shown in FIG. 7. For purposes of explanation let it be assumed that it is desired to light up a 16 by 16 dot matrix on the television screen as shown in FIG. 8. The contents for this image are stored in one of the random access memory units of image memory 60 and for purposes of this example it will be assumed that this 16 by 16 dot image is stored in the first 32 words of memory unit 61. The example matrix shown is located between columns 64 and 79 and rows 128 and 143 of the 256 by 256 master matrix. Data relative to the location that the image is to be placed on the screen is received by conventional magnitude comparators 103, 104 from the output registers of register memory 70. In this instance output register 73 will provide the 8 bit binary number indicative of the desired starting point of the matrix in the horizontal direction, that is, column 64, to comparator 103 and output register 74 will provide the 8 bit binary number indicative of the desired starting point of the matrix in the vertical direction, that is, row 128, to comparator 104. At the same time comparators 103 and 104 are receiving the 8 bit binary code outputs from beam tracker 20 indicative of the actual position of the electron beam.

Assuming the scan to begin in the upper left-hand corner of that master matrix, that is, row 0, column 0, when the beam reaches column 64 in row 0 comparator 103 detects a match and sets flip flop 105 whose output goes to AND gate 106. However, because flip flop 107 has not been triggered by comparator 104, the AND gate 106 is off. Flip flop 105 remains on until reset by the horizontal sync signal through reset logic circuit 108, to be hereinafter described. Thus, as each row is scanned, flip flop 105 will be on for a time period starting with column 64 and ending at column 256. This will continue through row 127 and in fact through all rows but rows 128 through 143.

At the beginning of the scan of row 128, comparator 104 detects a match and sets flip flop 107. AND gate 106 will remain off until flip flop 105 is set by comparator 103 indicating that the beam has now reached column 64 of row 128. In a manner to be described, at the time the AND gate 106 goes high, a frequency divider 111 is enabled. Because image memory 60 stores the image data in 8 bit word form, memory 60 should be addressed at one-eighth the frequency at which the dots are to be displayed. Thus, the master clock signal divided by eight by divider 111 is fed to gate 109. Gate 109 is enabled by the output of AND gate 106 and divider 111. When divider 111 is enabled, its output immediately goes high rendering the output of AND gate 109 high.

The high output of gate 109, indicative of the beam reaching column 64 of row 128 in the example under discussion, triggers a one-shot multivibrator 112 which strobes an eight bit buffer register in a data routing and conversion circuit 113 (FIG. 6). Again two such circuits 113 and 114 are shown in FIG. 6, it being understood that there is one data routing and conversion circuit for each unit of image memory 60. The eight bit buffer register, upon being strobed, temporarily stores the one word at the output of memory unit 61. In the example under discussion, this single word contains the information necessary to light up the dots in columns 64 through 71 of row 128. This word was chosen by the address sent to memory unit 61 by a transfer circuit 115. Again, there is a transfer circuit for each memory unit of image memory 60 and thus two transfer circuits 115, 116 are shown in FIG. 6. Transfer circuit 115, which consists of a plurality of gates, is controlled by a gating-and-decoding circuit 118, another system of logic gates. When circuit 118 is not enabled, that is, not being accessed by microprocessor 41, a command signal is sent to transfer circuit 115 which permits circuit 115 to use the output of binary counter 110 and a second binary counter 119 as an address to memory unit 61.

One shot multivibrator 112 also triggers a second one shot multivibrator 120 which clocks binary counter 110 so that the address to memory unit 61 is updated to the next word needed for the particular image involved. In the example under discussion, this next word would contain the information necessary to light the dots in columns 72 through 79 of row 128. At the same time that the second word is being addressed, the first word stored in the buffer register of data routing and conversion circuit 113 is being serially clocked out by the master clock to sequentially light up the dots. The clocking of the buffer in circuit 113 is enabled by the output of flip flop 105 and the output of data is enabled by the output of AND gate 106. Upon arriving at column 72, all eight bits have been clocked out of circuit 113 at which time the output of divider 111 causes AND gate 109 to go high again thereby storing the second word in the buffer of circuit 113 by the triggering of multivibrator 112. Also, multivibrator 120 clocks counter 110. At that time reset logic circuit 108, because it has been previously set to detect a matrix of a 16 dot width, detects that data for the second line of the matrix is desired. Logic circuit 108 then resets counter 110 and clocks counter 119 so that counter 119 will change the address to memory unit 61 to the third word through transfer circuit 115. Logic circuit 108 also resets flip flop 105 so that the output of AND gate 106 is low for the remainder of row 128 in this example. Upon reaching column 64 of row 129, AND gate 106 goes high again and the sequence just described is repeated for the second line and actually, repeated through line 142.

When line 143 is reached, the sequence is the same until column 80 is reached, indicative that the end of the matrix has been reached. A reset logic circuit 121 has been receiving the signals from counter 119 and detects that the circuitry is requesting data for line 144 which is out of the matrix. Because reset logic circuit 121 has been preset to detect a matrix of 16 rows in height, counter 119 is reset to zero and flip flop 107 is reset. This turns off gate 106 for the remaining rows, that is, rows 144 through 255.

Each gating and decoding circuit 118 is enabled when microprocessor 41 indicates that it wants to address memory 60 as previously described. This could happen when image data is to be initially loaded in memory 60 or when data is to be changed or updated. When enabled, all circuits 118 decode the control bus from microprocessor 41 to determine whether microprocessor 41 wishes to read from or write to memory; command transfer circuits 115, 116 to transmit the address from the address bus of microprocessor 41 to memory 60 instead of transmitting the address from counters 110 and 119; and cause the outputs of memory units 61 and 62 to be transferred from the buffer in data routing and conversion circuits 113, 114, respectively, to the data bus of microprocessor 41.

The image outputs of the memory and control circuit 30 are thus the outputs from the plurality of data routing and conversion circuits 113, 114. These signals, as well as analog signals from analog output circuit 33 are received by the data mixer 14 best shown in FIG. 9. Data mixer 14 includes a channel coding circuit for each data routing and conversion circuit. Thus, in the example shown, channel coding circuits 131 and 132 receive the signals from circuits 113 and 114, respectively. Each channel coding circuit has four output lines, each of which is OR tied to the corresponding lines of the other channel coding circuits. When the signal from a data routing and conversion circuit is high, a predetermined combination of outputs from the associated channel coding circuit will be low. These outputs are received by a conventional one of sixteen line decoder 133 which has a plurality of outputs each going to one of a plurality of analog switches 134A, 134B, and 134C. Each analog switch 134 also receives intensity data, in analog voltage form, from analog output circuit 33. Thus, using the example previously described, if it were desired to light the 16 by 16 dot matrix of FIG. 8 with an intensity corresponding to 10 volts, when circuit 113 would go high, in the manner previously described, channel coding circuit 131 could, for example, be set to force all of its outputs low. Decoding circuit 133 would recognize this and provide a high output on its zero line which would close analog switch 134A permitting the 10 volt signal present thereon to pass through to the video mixer 13. The television screen would thus be illuminated with an intensity corresponding to the 10 volt input as long as the output of circuit 113 remained high.

Figure 10:
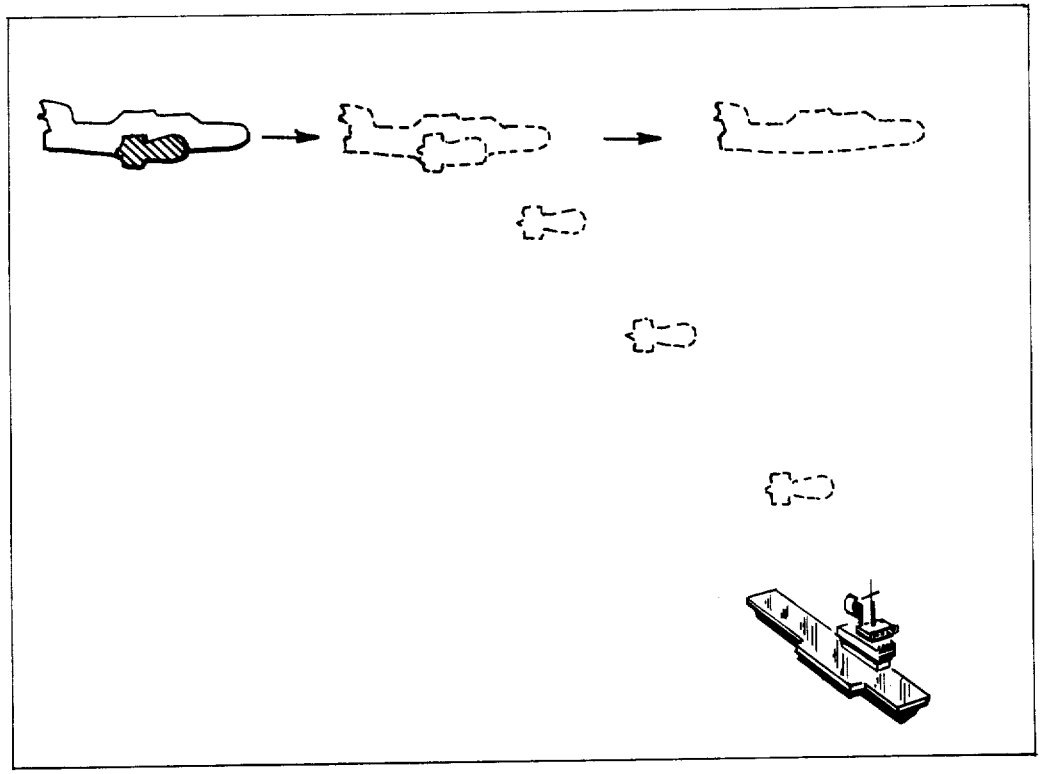
FIG. 10 is a view of the solution to one type of problem which can be displayed by the device of the present invention.
Figure 11:
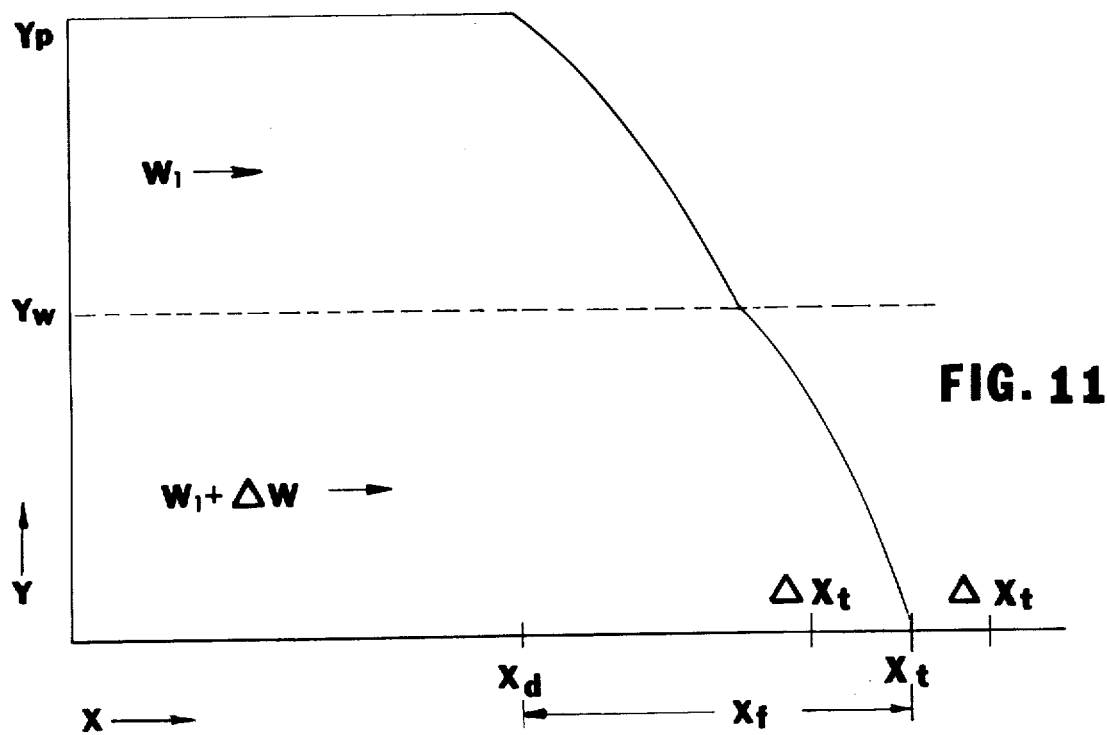
FIG. 11 is a graphic representation of the solution to the problem depicted in FIG. 10.

Having now described the apparatus for presenting a pictorial representation of a mathematical problem, the manner in which a specific problem can be set up and displayed will now be described with reference to FIGS. 10 and 11. The problem selected for presentation herein, relates to an airplane dropping a bomb on a target. In order to consider this problem in its simplest terms, the following mathematical model becomes pertinent. It will be assumed that the airplane is traveling at a constant speed V at a fixed altitude $Y_p$ along the X direction with the position of the airplane at any point in time being defined as $X_p$. The airplane is attempting to hit a target, the center location of which is $X_t$ with a "hit" range of $X_t \pm \Delta X_t$. It will be assumed that there is a constant wind velocity, $W_1$, known to the pilot of the airplane and that there is an altitude, $Y_W$, at which the wind velocity changes. This altitude and the amount of the wind change, defined as $\Delta W$, are not known to the pilot and the purpose of the problem is to visually depict what will happen to the trajectory of the bomb when $Y_W$ and/or $\Delta W$ are varied. The X coordinate of the airplane at any point in time t can be defined as follows:

$$X_p = [V + W_1]t \tag{1}$$

When the bomb is dropped, the altitude thereof, $Y_b$, will be governed by the free fall equation $$Y_b = Y_p - 16.1 t_d^2 \tag{2}$$

wherein $t_d$ is time measured from the time of the drop.

Knowing the velocity of the plane and the upper altitude wind velocity $W_1$, the X distance that the bomb travels after the point of drop $X_d$ until reaching the target $X_t$ will be defined as $X_f$ and is governed by the following equation $$X_f = [V + W_1]\sqrt{(Y_p/16.1)} \tag{3}$$

which is derived by solving equation 2 for $t_d$ with the altitude of the bomb at $Y_b = 0$. To determine the point of bomb drop $X_d$ one need only subtract $X_f$ from the target location $X_t$. The location of the bomb in the X direction, $X_b$, after being dropped is governed by the equation $$X_b = [V + W_1 + \Delta W]t_d + X_b \quad (4)$$

with $\Delta W$ being zero until $Y_b$ equals $Y_W$.

The solution to the problem is governed by the solution to the above equations, which equations are programmed on analog computer 31 using standard analog computer techniques with the equations being properly magnitude and time scaled. The various constants involved, $Y_p$, $V$, $W_1$, $\Delta W$, $Y_W$, and $\Delta X_t$, can be dialed into the analog computer or can be stored digitally in register memory 70 by feeding them through an input-/output device 34 and microprocessor 41. Once stored digitally, analog computer 31 can receive them through analog input circuit 32. Also programmed in memory 70 is the intensity data for the three images, that is, the target, airplane and bomb, and the discontinuous inputs to the bomb equations. These inputs relate to the time at which the bomb is dropped and the time when $\Delta W$ becomes a factor in the equation (4). So that microprocessor 41 is able to selectively review certain data, analog computer 31 is programmed to feed such parameters as $X_p$, $Y_p$, $X_b$, $Y_b$, $X_t$, $Y_t$, $\Delta W$, $W_1 + V$, and $X_d$ through analog output circuit 33 to register memory 70.

Next the particular images involved must be placed in image memory bank 60. This is done through the input-/output device 34 and microprocessor 41. From the previous description it is to be understood that there will be one memory unit, such as unit 61, for each image. At this time reset logic circuits 108 and 121 would be set for each memory unit, that is, each image dependent on the size of the matrix needed for the image. Because certain output registers 73, 74 etc. of register memory 70 are hard wired to corresponding memory units of image memory 60, particular output registers, one for the X coordinate and one for the Y coordinate, are identified with an image.

The answers to the problem provided by the analog computer 31 are interpreted by the microprocessor 41 which in turn uses that data to manipulate images on the screen to provide the dynamic visual representation of the problem. Microprocessor 41 can be programmed in a manner well within the knowledge of one skilled in the art in conjunction with programming manuals provided by the manufacturer to perform the various functions involved. In general, the microprocessor program will control the overall mode of the system, that is, stop, run or hold; and it will manipulate data in the register memory to control such factors as intensity and position of the images in the example problem being discussed.

More specifically, the microprocessor is programmed to store the parameters of the equations involved in register memory 70 unless those parameters have already been dialed into the analog computer as previously described. Then the intensity data for the initial condition of each image is loaded into memory 70. For example, if it were desired that the bomb not appear until the time of the drop, the initial intensity data in the register would instruct the analog computer to provide a zero volt output for that intensity.

Once the analog computer is started by the microprocessor, the operation of the microprocessor is governed by the program loaded in program memory 50 to continually update the information contained in the output registers of register memory 70 relating to the X-Y position of the images. In addition, the microprocessor will continually monitor the position of the airplane and compare it to $X_d$ to determine when the bomb should be dropped. At the time of the bomb drop, $t_d$ will be received by the analog computer for calculation of $Y_b$. The microprocessor will also be continually checking to determine when the bomb reaches $Y_W$ at which time the $\Delta W$ factor will be switched in to equation (4). The microprocessor will further determine when $Y_b$ becomes zero, that is, when the bomb hits the ground, and at that time whether the bomb hit within the target area, $X_t \pm \Delta X_t$. If it is determined that the bomb hit the target, both the bomb and the target can be made to disappear from the screen if the microprocessor has been programmed to change the intensity data in memory 70 on the occurrence.

Thus, by varying factors such as $Y_W$ and $\Delta W$, factors which would normally not be known to the pilot of an airplane, the observer can determine the effect of a change in wind profiles on the dropping of the bomb.

It should thus be evident that the device described herein is capable of pictorially representing a variety of mathematical problems. For example, the distribution of ash from a smokestack under variable wind conditions; the heat distribution through material; the concentrations of fluids being mixed in a tank; and like dynamic nonlinear mathematical models could all be studied thus substantially improving the art and otherwise accomplishing the objects of the present invention.

We claim:

1. Apparatus for dynamically presenting a sequence of fixed pictures each having one or more images, comprising:

image characteristics input means for providing signals indicative of the characteristics of the images;

image position input means for providing signals indicative of the desired position of each image in each of the sequence of fixed pictures;

means for displaying the sequence of fixed pictures;

means for scanning said means for displaying to present each image within each fixed picture;

means for monitoring said means for scanning and providing a signal indicative of the instantaneous position of said means for scanning;

control means including register circuit means for receiving, storing and transmitting said signals from said image position input means, image control circuit means for receiving said signals indicative of the desired position of each image from said register circuit means and for receiving said signals indicative of said instantaneous position of said means for scanning from said means for monitoring, image memory means for receiving and storing said signals indicative of the characteristics of the images, said image control circuit further including first gating circuit means for gating said signals indicative of the characteristics of the images to said means for displaying, and means for comparing said signal indicative of said instantaneous position of said means for scanning with said signal indicative of the desired position of each image and upon a match thereof enabling said first gating circuit means to permit the appropriate image to be displayed, said means for comparing including reset means for resetting said means for comparing after the presentation of each image and after the completion of each scan by said means for scanning and to provide an output signal indicative of the completion of each scan by said means for scanning; and means for directing said control means to receive and store said signals from said image characteristics input means, to receive and store said signals from said image position input means for a first fixed picture, to present each image for said first fixed picture, and, upon the occurrence of said output signal indicative of the completion of each scan, directing said control means to receive and store said signals from said image position input means for the next fixed picture, so that repetitive operation thereof will dynamically present a sequence of fixed pictures.

2. Apparatus according to claim 1 wherein said means for displaying includes a television receiver, said means for scanning provides an electron beam scanning through a matrix of dots, said apparatus further comprising sync generator means providing signals to control the scanning of the electron beam of said television receiver.

3. Apparatus according to claim 2 wherein said means for displaying further includes video mixer means receiving the signals from said sync generator means and said signals indicative of the characteristics of the images from said first gating circuit means and providing an output signal, and modulator means receiving the output signal of said video mixer means for providing a signal to said television receiver.

4. Apparatus according to claim 3 wherein said image position input means provides output signals indicative of a desired intensity of the electron beam for selected images in the sequence of fixed pictures, said apparatus further comprising data mixer means receiving the output signals from said image position input means indicative of a desired intensity of the electron beam for selected images in the sequence of fixed pictures, and receiving the signals from said first gating circuit means for providing a signal to said video mixer means.

5. Apparatus according to claim 4 wherein said data mixer means includes a plurality of analog switches.

6. Apparatus according to claim 1 wherein said means for displaying includes a television receiver, said means for scanning provides an electron beam scanning through a matrix of dots, said means for monitoring said means for scanning is a beam tracker for providing an output signal indicative of the instantaneous position of the electron beam within the matrix, said apparatus further comprising sync generator means providing signals to control the scanning of the electron beam and clock means providing an output signal to coordinate the timing of the signals of said sync generator means, said beam tracker receiving the output signals of said sync generator means and said clock means.

7. Apparatus according to claim 6 wherein said beam tracker includes first counter means receiving the output signal of said clock means and providing an output signal indicative of the horizontal position of the electron beam within the matrix, second counter means receiving the output signals of said sync generator means and providing an output signal indicative of the vertical position of the electron beam within the matrix, and decoder means receiving the output signals from said first and second counter means and providing an output signal of said beam tracker means to said image control circuit means, other output signals of said beam tracker means being provided to said control means by said first and second counter means.

8. Apparatus according to claim 1 wherein said image position input means includes an analog computer and said means for directing said control means includes a microprocessor.

9. Apparatus according to claim 8 further comprising, means to program said microprocessor, said means to program also selectively providing signals to said control means, said control means utilizing said signals as an output to said analog computer.

10. Apparatus according to claim 9 further comprising, analog input circuit means receiving a signal from said control means and providing output signals to said analog computer.

11. Apparatus according to claim 10 wherein said analog input circuit means includes a plurality of digital to analog converters.

12. Apparatus according to claim 11 wherein said analog input circuit means further includes a decoder/demultiplexer.

13. Apparatus according to claim 1 wherein said image position input means is an analog computer, said apparatus further comprising analog output circuit means receiving the output signals indicative of the desired position of each image in each of the sequence of fixed pictures from said analog computer and providing an output signal to said control means.

14. Apparatus according to claim 13 wherein said analog output circuit means includes an analog to digital converter.

15. Apparatus according to claim 13 wherein said analog output circuit means includes a multiplexer which receives signals from said analog computer indicative of the operating status thereof and provides output signals to said control means.

16. Apparatus according to claim 13 wherein said means for displaying includes a television receiver, said means for scanning provides an electron beam scanning through a matrix of dots, selected groups of dots constituting separate images, said analog computer providing output signals indicative of the desired intensity of the electron beam for selected images, said analog output circuit means receiving the output signals indicative of the desired intensity and providing an amplified output signal thereof, said apparatus further comprising data mixer means receiving the output signs from said gating circuit means and the amplified output signals from said analog output circuit means and providing an output signal, said television receiver receiving the output signal of said data mixer means so that images of varying intensity can be displayed.

17. Apparatus according to claim 1 wherein said control means includes a program memory circuit and said means for directing said control means includes a microprocessor, said apparatus further comprising means to feed a program into said program memory circuit, said program memory circuit thereby controlling the operation of said microprocessor.

18. Apparatus according to claim 1 wherein said register circuit means includes register memory means to receive, store and transmit data.

19. Apparatus according to claim 18 wherein said register memory means includes a plurality of input register means and a plurality of output register means, each of said register means being capable of storing data therein and being assigned an address, said means for directing said control means being programmed to identify an address for said input and output register means.

20. Apparatus according to claim 19 wherein said input register means receive and store said signals from said image position input means.

21. Apparatus according to claim 19 wherein said output register means store data relating to the sequence of fixed pictures to be dynamically presented, said input means selectively receiving the data in said output register means.

22. Apparatus according to claim 19, said register circuit means further including register control circuit means by which said means for directing said control means can receive the data from said input and output register means and transmit data to said output register means.

23. Apparatus according to claim 22 wherein said register control circuit means includes address decoding circuit means which receives signals from said means for directing said control means for determining whether said means for directing said control means wishes to receive data from said input register means or said output register means or transmit data to said output register means.

24. Apparatus according to claim 23 wherein said address decoding circuit means provides an enable signal when said means for directing said control means wishes to receive data from said input register means, said register control circuit means further including second gating circuit means receiving the enable signal and permitting data from the input register means to be transmitted to said means for directing said control means.

25. Apparatus according to claim 23 wherein said register control circuit means further includes read/write control circuit means receiving a signal from said means for directing said control means for determining whether said means for directing said control means wishes to transmit data to or receive data from said output registers, said address decoding circuit means providing a signal to said read/write control circuit means when said means for directing said control means wishes to transmit data to or receive data from said output registers.

26. Apparatus according to claim 25 wherein said read/write control circuit means provides an enable signal when said means for directing said control means wishes to receive data from said output register means, said register control circuit means further including additional gating circuit means receiving the enable signal of said read/write control circuit means and permitting data from said output register means to be transmitted to said means for directing said control means.

27. Apparatus according to claim 1, said register circuit means further including register memory means to receive, store and transmit data, said register memory means including a plurality of input register means and a plurality of output register means, each of said register means being capable of storing data therein and being assigned an address, said image memory means including a plurality of random access word addressable memory units, each of said memory units being capable of storing data therein indicative of the characteristics of an image to be depicted and being assigned an address, said means for directing said control means being programmed to identify an address for said input and output register means and said memory units.

28. Apparatus according to claim 27, said control means further including memory mode control circuit means receiving an address signal from said means for directing said control means and selectively determining whether said means for directing said control means is directing said signal to said register memory means or said image memory means.

29. Apparatus according to claim 28 wherein said memory mode control means includes decoding means to determine whether the address signal from said means for directing said control means is to be directed to said register memory means or said image memory means.

30. Apparatus according to claim 29 wherein said register circuit means further includes register control circuit means receiving a signal from said memory mode control means when said memory mode control means determines that the address signal from said means for directing said control means is to be directed to said register memory means and said image control circuit means receiving a signal from said memory mode control means when said memory mode control means determines that the address signal from said means for directing said control means is to be directed to said image memory means.

31. Apparatus according to claim 1 wherein said image memory means includes a plurality of random access word addressable memory units, each of said memory units being capable of storing data therein indicative of the characteristics of an image to be depicted.

32. Apparatus according to claim 1 wherein said image control circuit means controls the particular image to be displayed at any one time on said means for displaying.

33. Apparatus according to claim 32 wherein said means for displaying includes a television receiver, said means for scanning provides an electron beam scanning through a matrix of dots, said means for monitoring said means for scanning is a beam tracker for providing an output signal indicative of the instantaneous position of the electron beam within the matrix, said register circuit means including register memory means to receive and store data relative to the position that the images are to appear within the matrix, and said means for comparing receiving the output signal from said beam tracker and the data from said register memory means and providing an output signal upon a match thereof indicative that the electron beam has reached the location within the matrix where the image is to be displayed.

34. Apparatus according to claim 33 wherein said image control circuit means further includes means receiving the output signal of said comparator means to address said image memory means.

35. Apparatus according to claim 34 wherein said image position input means provides output signals indicative of the desired intensity of the electron beam for selected images, said image control circuit means further including circuit means receiving the image data from said image memory means when addressed by said means to address and providing an output signal indicative thereof, said apparatus further comprising data mixer means receiving the output signal of said circuit means and the output signals indicative of the desired intensity from said input means and providing an output signal to said television receiver so that the image may be displayed.

* * * * *